United States Patent
Morris et al.

(10) Patent No.: US 12,056,525 B2
(45) Date of Patent: Aug. 6, 2024

(54) HYBRID SCHEDULING METHOD FOR DEEP LEARNING WORKLOADS, AND COMPUTING APPARATUS WITH HYBRID SCHEDULING

(71) Applicant: SAMSUNG ELECTRONICS CO., LTD., Suwon-si (KR)

(72) Inventors: Peter Morris, Suwon-si (KR); Jinseong Kim, Suwon-si (KR); Hyesun Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 15 days.

(21) Appl. No.: 17/197,690

(22) Filed: Mar. 10, 2021

(65) Prior Publication Data

US 2022/0083378 A1  Mar. 17, 2022

(30) Foreign Application Priority Data

Sep. 16, 2020 (KR) .................. 10-2020-0118762

(51) Int. Cl.
*G06F 9/48* (2006.01)
*G06F 9/50* (2006.01)
(Continued)

(52) U.S. Cl.
CPC .............. *G06F 9/5005* (2013.01); *G06F 9/48* (2013.01); *G06F 9/4881* (2013.01); *G06F 9/50* (2013.01);
(Continued)

(58) Field of Classification Search
CPC . G06F 9/48; G06F 9/4881; G06F 9/50; G06F 9/5005; G06F 9/5011;
(Continued)

(56) References Cited

U.S. PATENT DOCUMENTS

| 8,001,063 B2 | 8/2011 | Tesauro et al. |
| 10,304,154 B2 | 5/2019 | Appu et al. |

(Continued)

FOREIGN PATENT DOCUMENTS

| CN | 108920259 A | 11/2018 |
| CN | 109005060 A | 12/2018 |

(Continued)

OTHER PUBLICATIONS

Melnik et al, "Workflow scheduling using Neural Networks and Reinforcement learning", 8th International Young Scientist Conference on Computational Science, Aug. 2019, Elsevier, pp. 29-36 (Year: 2019).*

(Continued)

*Primary Examiner* — Charles M Swift
(74) *Attorney, Agent, or Firm* — NSIP Law

(57) ABSTRACT

A scheduling method performed by a computing apparatus includes: generating an input vector including a resource status and metadata of each of tasks for parallel execution; determining an action for the input vector by executing an actor network based on the input vector; performing first resource scheduling for each of the tasks based on the determined action; performing second resource scheduling for each of the tasks based on the input vector; evaluating performance of first resource scheduling results of the first resource scheduling and second resource scheduling results of the second resource scheduling, for each of the tasks, using a critic network; selecting one of the first and second resource scheduling results for each of the tasks based on a result of the evaluating; and allocating resources to each of the tasks based on a resource scheduling result selected for each of the tasks.

21 Claims, 12 Drawing Sheets

(51) Int. Cl.
  *G06N 3/08* (2023.01)
  *G06N 20/00* (2019.01)
(52) U.S. Cl.
  CPC .......... *G06F 9/5011* (2013.01); *G06F 9/5038* (2013.01); *G06F 9/5094* (2013.01); *G06N 3/08* (2013.01); *G06F 2209/501* (2013.01); *G06F 2209/505* (2013.01); *G06N 20/00* (2019.01)
(58) Field of Classification Search
  CPC .... G06F 9/5038; G06F 9/5077; G06F 9/5094; G06F 2209/501; G06F 2209/505; G06N 20/00; G06N 3/08
  See application file for complete search history.

(56) References Cited

U.S. PATENT DOCUMENTS

| | | | |
|---|---|---|---|
| 2016/0098292 A1* | 4/2016 | Boutin | G06F 9/4881 718/104 |
| 2017/0195247 A1* | 7/2017 | Tao | H04L 47/70 |
| 2018/0165579 A1 | 6/2018 | Friel et al. | |
| 2021/0049424 A1* | 2/2021 | Lin | H04L 43/04 |
| 2021/0073047 A1* | 3/2021 | Bhandaru | G06F 9/5044 |

FOREIGN PATENT DOCUMENTS

| | | |
|---|---|---|
| KR | 10-2010-0006032 A | 1/2010 |
| KR | 10-2017-0116439 A | 10/2017 |
| KR | 10-2019-0043411 A | 4/2019 |

OTHER PUBLICATIONS

Daoud et al, "An Efficient Genetic Algorithm for Task Scheduling in Heterogeneous Distributed Computing Systems", 2006 IEEE Congress on Evolutionary Computation, Jul. 16-21, 2006 , IEEE, pp. 3258-3265 (Year: 2006).*
Park et al, "Adaptative scheduling on heterogeneous systems using support vector machine", Computing (2017) 99:405-425, Springer, pp. 405-425 (Year: 2017).*
Mao, Hongzi, et al. "Resource management with deep reinforcement learning." *Proceedings of the 15th ACM Workshop on Hot Topics in Networks.* 2016. (7 pages in English).
Tsoutsouras, Vasileios, et al. "A hierarchical distributed runtime resource management scheme for noc-based many-cores." *ACM Transactions on Embedded Computing Systems (TECS)* 17.3 (2018): 1-26. (26 pages in English).
Sriraman, Akshitha, and Abhishek Dhanotla. "Accelerometer: Understanding acceleration opportunities for data center overheads at hyperscale." *Proceedings of the Twenty-Fifth International Conference on Architectural Support for Programming Languages and Operating Systems.* 2020. (18 pages in English).
Park, Jongsoo, et al. "Deep learning inference in facebook data centers: Characterization, performance optimizations and hardware implications." arXiv preprint arXiv:1811.09886 (2018). (12 pages in English).
Mao, Hongzi, et al. "Learning scheduling algorithms for data processing clusters." *Proceedings of the ACM Special Interest Group on Data Communication.* 2019. 270-288. (6 pages in English).
Boyan, Justin, and Andrew W. Moore. "Learning evaluation functions to improve optimization by local search." *Journal of Machine Learning Research* Nov. 1, 2000: 77-112. (36 pages in English).
Joardar, Biresh Kumar, et al. "Learning-based application-agnostic 3D NoC design for heterogeneous manycore systems." *IEEE Transactions on Computers* 68.6 (2018): 852-866. (15 pages in English).
Singh, Amit Kumar, et al. "Learning-based run-time power and energy management of multi/many-core systems: Current and future trends." *Journal of Low Power Electronics* 13.3 (2017): 310-325. (26 pages in English).
Liu, Yu, and Wei Zhang. "Two-level scratchpad memory architectures to achieve time predictability and high performance." *Journal of Computing Science and Engineering* 8.4 (2014): 215-227. (13 pages in English).
Martinez, Jose F., and Engin Ipek. "Dynamic multicore resource management: A machine learning approach." *IEEE micro* 29.5 (2009): 8-17. (10 pages in English).
Kanev, Svilen, et al. "Tradeoffs between power management and tail latency in warehouse-scale applications." *2014 IEEE International Symposium on Workload Characterization (IISWC).* IEEE, 2014. (10 pages in English).
Kim, Sungchan, et al. "Software platform for hybrid resource management of a many-core accelerator for multimedia applications." *2014 IEEE 12th Symposium on Embedded Systems for Real-time Multimedia (ESTIMedia).* IEEE, 2014. (8 pages in English).
Hazelwood, Kim, et al. "Applied machine learning at facebook: A datacenter infrastructure perspective." *2018 IEEE International Symposium on High Performance Computer Architecture (HPCA).* IEEE, 2018. (10 pages in English).

\* cited by examiner

HYBRID SCHEDULING METHOD FOR DEEP LEARNING WORKLOADS, AND COMPUTING APPARATUS WITH HYBRID SCHEDULING

CROSS-REFERENCE TO RELATED APPLICATIONS

This application claims the benefit under 35 U.S.C. § 119(a) of Korean Patent Application No. 10-2020-0118762 filed on Sep. 16, 2020 in the Korean Intellectual Property Office, the entire disclosure of which is incorporated herein by reference for all purposes.

BACKGROUND

1. Field

The following description relates to hybrid scheduling for deep learning workloads.

2. Description of Related Art

With the development of artificial intelligence (AI) technology, a demand for dedicated hardware for AI is increasing. For example, AI may perform inference and training through specific operations. As such, various devices are being developed as dedicated hardware for implementing and executing AI. Recently, a deep learning accelerator (DLA) has been provided. There is a demand for an optimal scheduling method to increase a resource efficiency of the DLA.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a scheduling method performed by a computing apparatus includes: generating an input vector including a resource status and metadata of each of tasks for parallel execution; determining an action for the input vector by executing an actor network based on the input vector; performing first resource scheduling for each of the tasks based on the determined action; performing second resource scheduling for each of the tasks based on the input vector; evaluating performance of first resource scheduling results of the first resource scheduling and second resource scheduling results of the second resource scheduling, for each of the tasks, using a critic network; selecting one of the first and second resource scheduling results for each of the tasks based on a result of the evaluating; and allocating resources to each of the tasks based on a resource scheduling result selected for each of the tasks.

The determined action may include a priority of each of hardware configurations of each of the tasks.

The performing of the first resource scheduling may include performing the first resource scheduling for each of the tasks based on the priority of each of the hardware configurations of each of the tasks.

The hardware configurations of each of the tasks may be different hardware allocations that allow each of the tasks to run.

The scheduling method may further include: determining that the tasks are independent of each other and selecting the tasks, in response to an occurrence of a rescheduling point in an execution code being recognized.

The rescheduling point may correspond to a start of a deep learning (DL) application, a completion of a task among the tasks, or an end of the DL application.

The performing of the second resource scheduling may include performing the second resource scheduling for each of the tasks by applying the input vector to a heuristic algorithm.

The evaluating of the performance may include: calculating a current reward of the first resource scheduling result of one task among the tasks and a quality value of the first resource scheduling result of the one task using the critic network; and calculating a current reward of the second resource scheduling result of the one task and a quality value of the second first resource scheduling result of the one task using the critic network.

The evaluating of the performance may include: calculating the current reward of the first resource scheduling result of the one task based on a total energy consumption and an application latency associated with the one task, in response to an assumption that resources based on the first resource scheduling are utilized for the one task; and calculating the current reward of the second resource scheduling result of the one task based on the total energy consumption and the application latency associated with the one task, in response to an assumption that resources based on the second resource scheduling are utilized for the one task.

The metadata may include any one or any combination of any two or more of an identifier of each of the tasks, a prerequisite task of each of the tasks, information about an input of each of the tasks, information about an output of each of the tasks, a batch identifier, and a configuration profiles of each of the tasks.

The configuration profiles of each of the tasks may include hardware configurations of each of the tasks, and an expected performance value of each of the hardware configurations.

In another general aspect, a non-transitory, computer-readable storage medium stores instructions that, when executed by a processor, cause the processor to perform the scheduling method described above.

In another general aspect, a computing apparatus includes: a controller configured to: generate an input vector including a resource status and metadata of each of tasks for parallel execution; determine an action for the input vector by executing an actor network based on the input vector; perform first resource scheduling for each of the tasks based on the determined action; perform second resource scheduling for each of the tasks based on the input vector; evaluate performance of a first resource scheduling result of the first resource scheduling and a second resource scheduling result of the second resource scheduling, for each of the tasks, using a critic network; select one of the first and second resource scheduling results based on a result of the evaluating; and allocate resources to each of the tasks based on the selected resource scheduling result.

The determined action may include a priority of each of hardware configurations of each of the tasks.

The controller may be further configured to perform the first resource scheduling for each of the tasks based on the priority of each of the hardware configurations of each of the tasks.

The hardware configurations of each of the tasks may be different hardware allocations that allow each of the tasks to run.

The controller may be further configured to determine that the tasks are independent of each other and select the tasks, in response to an occurrence of a rescheduling point in an execution code being recognized.

The rescheduling point may correspond to a start of a deep learning (DL) application, a completion of a task among the tasks, or an end of the DL application.

The controller may be further configured to perform the second resource scheduling for each of the tasks by applying the input vector to a heuristic algorithm.

The controller may be further configured to: calculate a current reward of the first resource scheduling result of one task among the tasks and a quality value of the first resource scheduling result of the one task using the critic network; and calculate a current reward of the second resource scheduling result of the one task and a quality value of the second first resource scheduling result of the one task using the critic network.

The controller may be further configured to: calculate the current reward of the first resource scheduling result of the one task based on a total energy consumption and an application latency associated with the one task, in response to an assumption that resources based on the first resource scheduling are utilized for the one task; and calculate the current reward of the second resource scheduling result of the one task based on the total energy consumption and the application latency associated with the one task, in response to an assumption that resources based on the second resource scheduling are utilized for the one task.

Other features and aspects will be apparent from the following detailed description, the drawings, and the claims.

Figure 1:
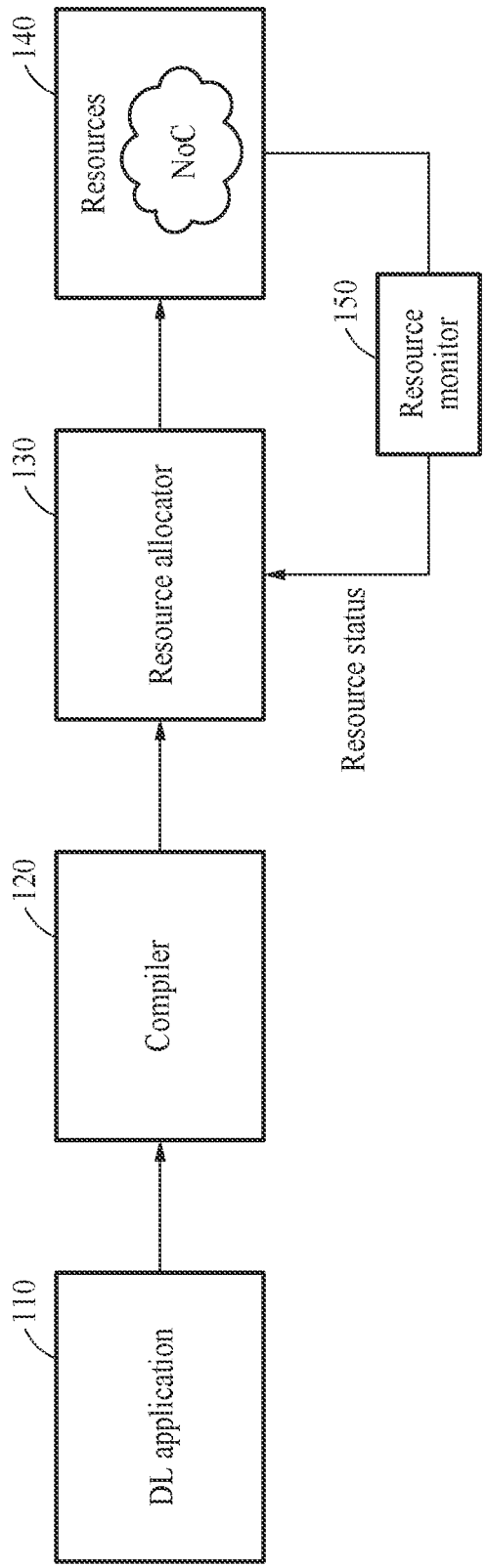
FIG. 1 illustrates an example of hybrid scheduling.

Throughout the drawings and the detailed description, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

It will be understood that when a component is referred to as being "connected to" another component, the component can be directly connected or coupled to the other component or intervening components may be present.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Herein, it is noted that use of the term "may" with respect to an example, for example, as to what an example may include or implement, means that at least one example exists in which such a feature is included or implemented while all examples are not limited thereto.

Unless otherwise defined herein, all terms used herein including technical or scientific terms have the same meanings as those generally understood. Terms defined in dictionaries generally used should be construed to have meanings matching with contextual meanings in the related art and are not to be construed as an ideal or excessively formal meaning unless otherwise defined herein.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 illustrates an example of hybrid scheduling.

FIG. 1 illustrates a deep learning (DL) application 110, a compiler 120, a resource allocator 130, resources 140, and a resource monitor 150.

The DL application 110 may correspond to at least one DL workload. The DL workload may include, but is not limited to, for example, a computer vision, pattern recognition, or machine translation.

The resources 140 may include a plurality of clusters (for example, neural processing unit (NPU) clusters), and a plurality of memories (for example, a scratchpad memory (SPM)). The clusters and memories may be connected through a network-on-chip (NoC), for example.

The resource monitor 150 may monitor the resources 140 and may provide a resource status to the resource allocator 130.

The compiler 120 may decompose the DL application 110 into tasks. A task may correspond to, for example, an operation of a DL model, or a layer of the DL model. Also, the compiler 120 may analyze each of the tasks, and may propose potential hardware resource allocations for each of the tasks. The proposed potential hardware resource allocations may be used to create configuration profiles of each of the tasks. The compiler 120 may generate metadata of each of the tasks based on configuration profiles of each of the tasks and a variety of information, for example, an input of each of the tasks.

The compiler 120 may insert a rescheduling point into an execution code. The execution code may be an optimization code generated for a plurality of DL applications by the compiler 120. However, the execution code is not limited to the foregoing example, and may be a code generated for a single DL application 110 by the compiler 120. The rescheduling point will be further described below.

The resource allocator 130 may allocate optimal resources to a task based on a resource status and metadata of the task. In an example, the resource allocator 130 may perform reinforcement learning (RL)-based scheduling and heuristic scheduling on a task, may compare a result of the RL-based scheduling to a result of the heuristic scheduling, may select a scheduling result with better performance, and may allocate resources to tasks according to the selected scheduling result. Accordingly, the resource allocator 130 may minimize a resource mapping time, and may support dynamic mapping according to a runtime status. Also, the resource allocator 130 may enhance scheduling granularity, and may enhance hardware utilization through the enhanced scheduling granularity. When a request for a plurality of DL applications is sent to a host, the resource allocator 130 may allocate resources so that the DL applications may be processed in parallel. Also, the resource allocator 130 may schedule one or more heterogeneous machine learning (ML) workloads and/or one or more homogeneous ML workloads.

Figure 2:
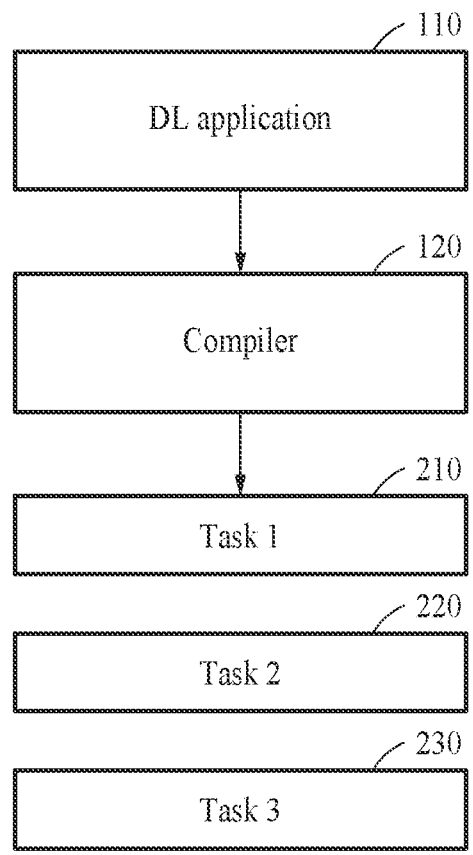
FIG. 2 illustrates an example implementation of a compiler.

FIG. 2 illustrates an example implementation of the compiler 120 of FIG. 1.

Referring to FIG. 2, the compiler 120 may decompose the DL application 110 into a task 1 210, a task 2 220 and a task 3 230.

The compiler 120 may generate configuration profiles of each of the task 1 210, the task 2 220, and the task 3 230. For example, the compiler 120 may generate configuration profiles of each of the task 1 210, the task 2 220, and the task 3 230 based on minimum required resources, maximum useful resources, and an optimal number of resources that may obtain the maximum performance. Configuration profiles will be described below with reference to FIG. 3.

Figure 3:
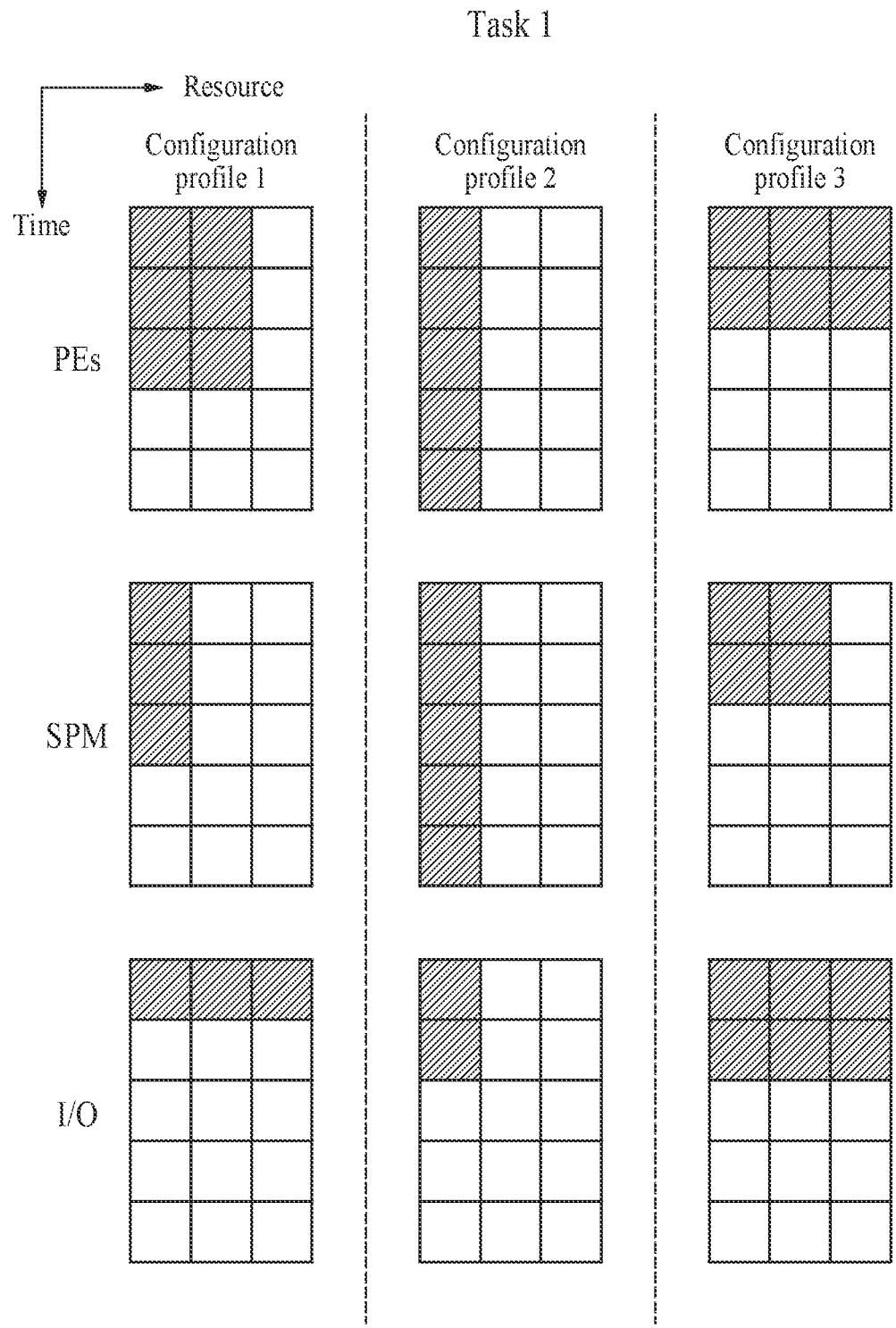
FIG. 3 illustrates an example of configuration profiles of a task.

FIG. 3 illustrates an example of configuration profiles of the task 1 210. In FIG. 3, the compiler 120 may generate configuration profiles 1 through 3 of the task 1 210. The configuration profiles 1 through 3 may include different hardware configurations, hardware allocations, or hardware requirements that allow the task 1 210 to run.

The configuration profile 1 may include a first hardware configuration in which two units of processing elements (PEs) and one unit of an SPM are required in three time steps, and three units of an input/output (I/O) interface are required in one time step, for the task 1 210. A PE may also be referred to as a "core". The configuration profile 2 may include a second hardware configuration in which one unit of PEs and one unit of an SPM are required in five time steps, and one unit of an I/O interface is required in two time steps, for the task 1 210. The configuration profile 3 may include a third hardware configuration in which three units of PEs and two units of an SPM are required in two time steps, and three units of an I/O interface are required in two time steps, for the task 1 210.

Although not shown in FIG. 3, each of the configuration profiles 1 through 3 may include an expected performance value of each hardware configuration.

Similarly, the compiler 120 may generate configuration profiles of each of the task 2 220 and the task 3 230.

The compiler 120 may generate metadata of each of the task 1 210, the task 2 220, and the task 3 230. The metadata of each of the task 1 210, the task 2 220, and the task 3 230 may include input and output information and configuration profiles of each of the task 1 210, task 2 220, and the task 3 230. Table 1 shows examples of metadata of each of the task 1 210 through the task 3 230.

TABLE 1

| App ID | Task ID | Requirements | Inputs/Weights | Output | Configuration Profiles | Batch ID |
|---|---|---|---|---|---|---|
| 1 | Task 1 | — | Input a/Weight w1 | Size 1_1 and Address 1_1 | T 1[A], T 1[B], T 1[C] | Model ID, APP ID, and Task ID |
| 1 | Task 2 | Task 1 | Output/Weight w2 of Task 1_1 | Size 1_2 and Address 1_2 | T 2[A], T 2[B], T 2[C] | Model ID, APP ID, and Task ID |
| 1 | Task 3 | Task 2 | Output/Weight w3 of Task 1_2 | Size 1_3 | T 3[A], T 3[B], T 3[C] | Model ID, APP ID, and Task ID |

In Table 1, App ID represents an identifier of a DL application, Task ID represents an identifier of a task, Requirements represents a prerequisite task of a task, and Inputs/Weights represents an input and a weight of a task. In Table 1, requirements of a task 2 is a task 1, which may indicate that the task 1 needs to be completed before the task 2 is executed. Requirements may also be referred to as "dependency."

Also, in Table 1, Output represents information about an output of a task (for example, a size of an output and an address at which the output is to be stored), and Batch ID represents a batch identifier.

In addition, in Table 1, the task 1 210 includes configuration profiles T 1[A], T 1[B], and T 1[C]. The configuration profiles T 1[A], T 1[B], and T 1[C] may be different hardware configurations or hardware allocations for the task 1 210. The configuration profiles T 1[A], T 1[B], and T 1[C] may respectively correspond to the configuration profiles 1 through 3 of FIG. 3, for example. T 2[A], T 2[B], and T 2[C] may be different hardware configurations or hardware allocations for the task 2 220, and T 3[A], T 3[B], and T 3[C] may be different hardware configurations or hardware allocations for the task 3 230.

The compiler 120 may insert a rescheduling point of the DL application 110 into an execution code. For example, the compiler 120 may describe the rescheduling point in a desired form in the execution code. The rescheduling point of the DL application 110 may correspond to any one or any combination of a start of the DL application 110, a completion of each of the task 1 210 through the task 3 230 and an end of the DL application 110, however, the rescheduling point is not limited to the foregoing examples. The resource allocator 130, which will be described in more detail below, may perform rescheduling at the rescheduling point. Accordingly, resources may be allocated to a plurality of DL applications, and thus the DL applications may be executed in parallel.

Figure 4:
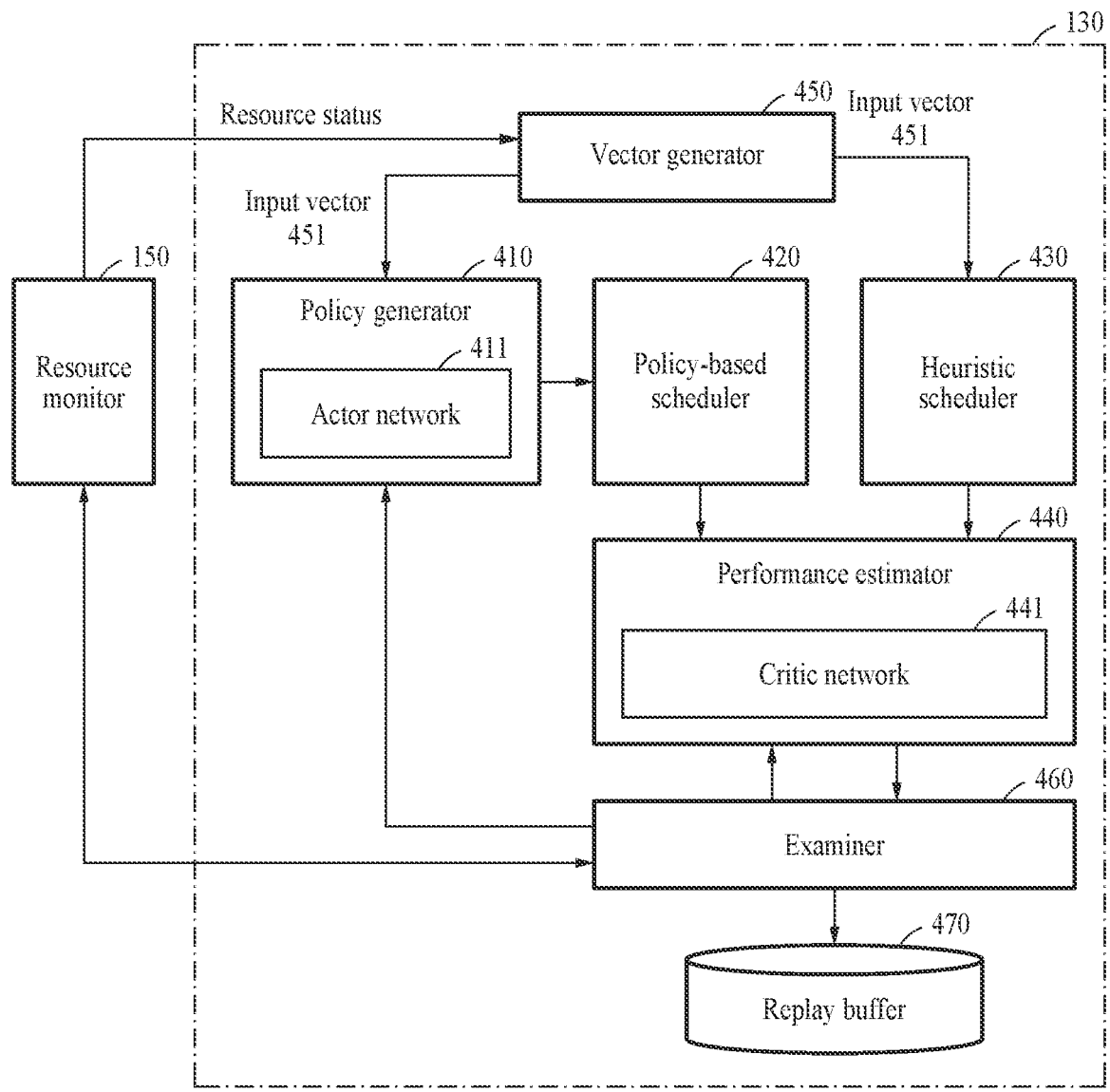
FIG. 4 illustrates an example of a resource allocator.

FIG. 4 illustrates an example of the resource allocator 130 of FIG. 1.

Referring to FIG. 4, the resource allocator 130 may include, for example, a policy generator 410, a policy-based scheduler 420, a heuristic scheduler 430, a performance estimator 440, a vector generator 450, an examiner 460, and a replay buffer 470.

The policy-based scheduler 420 may recognize an occurrence of a rescheduling point. Since the rescheduling point is included in the execution code as described above, the policy-based scheduler 420 may recognize an occurrence of the rescheduling point based on the execution code.

When the occurrence of the rescheduling point is recognized, the policy-based scheduler 420 may determine whether there is a task to be executed in parallel with the task 1 210 of the DL application 110. In other words, the policy-based scheduler 420 may select tasks to be executed in parallel. For example, when a new DL application A is enqueued in a host, the policy-based scheduler 420 may determine that a task a of the DL application A and the task 1 210 of the DL application 110 are independent of each other. In an example, the policy-based scheduler 420 may determine that the task a and the task 1 210 are independent of each other, based on metadata of each of the task a and the task 1 210. The policy-based scheduler 420 may select the task a and the task 1 210 as tasks to be executed in parallel. Based on the above selection, the policy-based scheduler 420 may perform rescheduling. Hereinafter, an example will be further described.

The vector generator 450 may acquire a current resource status from the resource monitor 150, and may generate an input vector 451 that includes the acquired current resource status, metadata of the task a and metadata of the task 1 210. The vector generator 450 may provide the input vector 451 to each of the policy generator 410 and the heuristic scheduler 430.

As shown in FIG. 4, the vector generator 450 generates the input vector 451 and provides the input vector 451 to each of the policy generator 410 and the heuristic scheduler 430. However, this functionality of the vector generator 450 is merely an example. For example, the resource allocator 130 may not include the vector generator 450, and each of the policy generator 410 and the heuristic scheduler 430 may directly generate the input vector 451.

The policy generator 410 may execute an actor network 411 based on the input vector 451.

The actor network 411 may also be referred to as a "policy network". The actor network 411 may be, for example, a deep neural network (DNN).

The actor network 411 may determine or select an action for the input vector 451. The determined action may include a priority of each of hardware configurations T 1[A], T 1[B] and T 1[C] for the task 1 210, and a priority of each of hardware configurations for the task a. The actor network 411 may transmit the determined action to the policy-based scheduler 420.

The policy-based scheduler 420 may perform first resource scheduling on the task 1 210 and the task a based on the determined action. In other words, the policy-based scheduler 420 may perform the first resource scheduling on the task 1 210 and the task a, based on the priority of each of the hardware configurations for the task 1 210 and the priority of each of the hardware configurations for the task a. In an example, the policy-based scheduler 420 may schedule resources$_{policy}$ 1_1 and resources$_{policy}$ 1_2 to the task 1 210, and may schedule resources$_{policy}$ a_1 and resources$_{policy}$ a_2 to the task a. The above-described first resource scheduling result is merely an example, and the first resource scheduling result is not limited to the above-described example.

The heuristic scheduler 430 may perform second resource scheduling on the task 1 210 and the task a, using the input vector 451. In an example, the heuristic scheduler 430 may apply the input vector 451 to a heuristic algorithm, to schedule resources$_{Heuristic}$ 1 to the task 1 210 and schedule resources$_{Heuristic}$ a to the task a. The above-described second resource scheduling result is merely an example, and the second resource scheduling result is not limited to the above-described example.

In an example, the heuristic scheduler 430 may be used to guarantee lower-bound performance of the resource allocator 130.

The performance estimator 440 may evaluate performance of the first resource scheduling result and the second resource scheduling result for the task 1 210, may select a resource scheduling result with the best performance based on an evaluation result, and may allocate resources to the task 1 210 according to the selected resource scheduling result. In other words, the performance estimator 440 may compare candidate resources for the task 1 210, and may allocate a candidate resource with the best performance to the task 1 210 based on a result of the comparison of the candidate resources for the task 1 210. The expression "better performance" used herein may indicate that an application latency and/or an energy consumption of a system may be minimized.

In an example, the performance estimator 440 may calculate a current reward of the first resource scheduling result for the task 1 210 and a current reward of the second resource scheduling result for the task 1 210, and may provide the calculated rewards to a critic network 441. An example of calculation of a current reward will be further described below with reference to FIG. 5. The critic network 441 may select a resource scheduling result that maximizes a cumulative sum of a current reward and a future reward, by estimating a Q function. In other words, the critic network 441 may select a resource scheduling result to reach a maximum expected cumulative reward. In an example, when the resources$_{policy}$ 1_1 are determined to have the best performance, the performance estimator 440 may allocate the resources$_{policy}$ 1_1 to the task 1 210.

Also, the performance estimator 440 may evaluate performance of the first resource scheduling result and the second resource scheduling result for the task a, using the critic network 441, may select a resource scheduling result with the best performance based on an evaluation result, and may allocate resources to the task a according to the selected resource scheduling result. In an example, when the resources$_{policy}$ a_2 are evaluated to have the best performance, the performance estimator 440 may allocate the resources$_{policy}$ a_2 to the task a.

The actor network 411 and the critic network 441 may be updated. To update the actor network 411 and the critic network 441, a deep deterministic policy gradient (DDPG) algorithm may be used. In an example, the performance estimator 440 may update or train the critic network 441 to minimize a critic loss, and the policy generator 410 may update or train the actor network 411 to minimize an actor loss through a deterministic policy gradient (DPG), which will be further described below.

The examiner 460 may measure a result of actual resource allocation, and may compensate for a reward function based on a measurement result. The reward function may include Equations 1 through 13 that will be described below. Accordingly, a current resource status of a system may be reflected to the reward function. Also, the examiner 460 may store information for training the critic network 441 as a sample in the replay buffer 470. The information may include, for example, the input vector 451, an action, a reward, and a next input vector.

Figure 5:
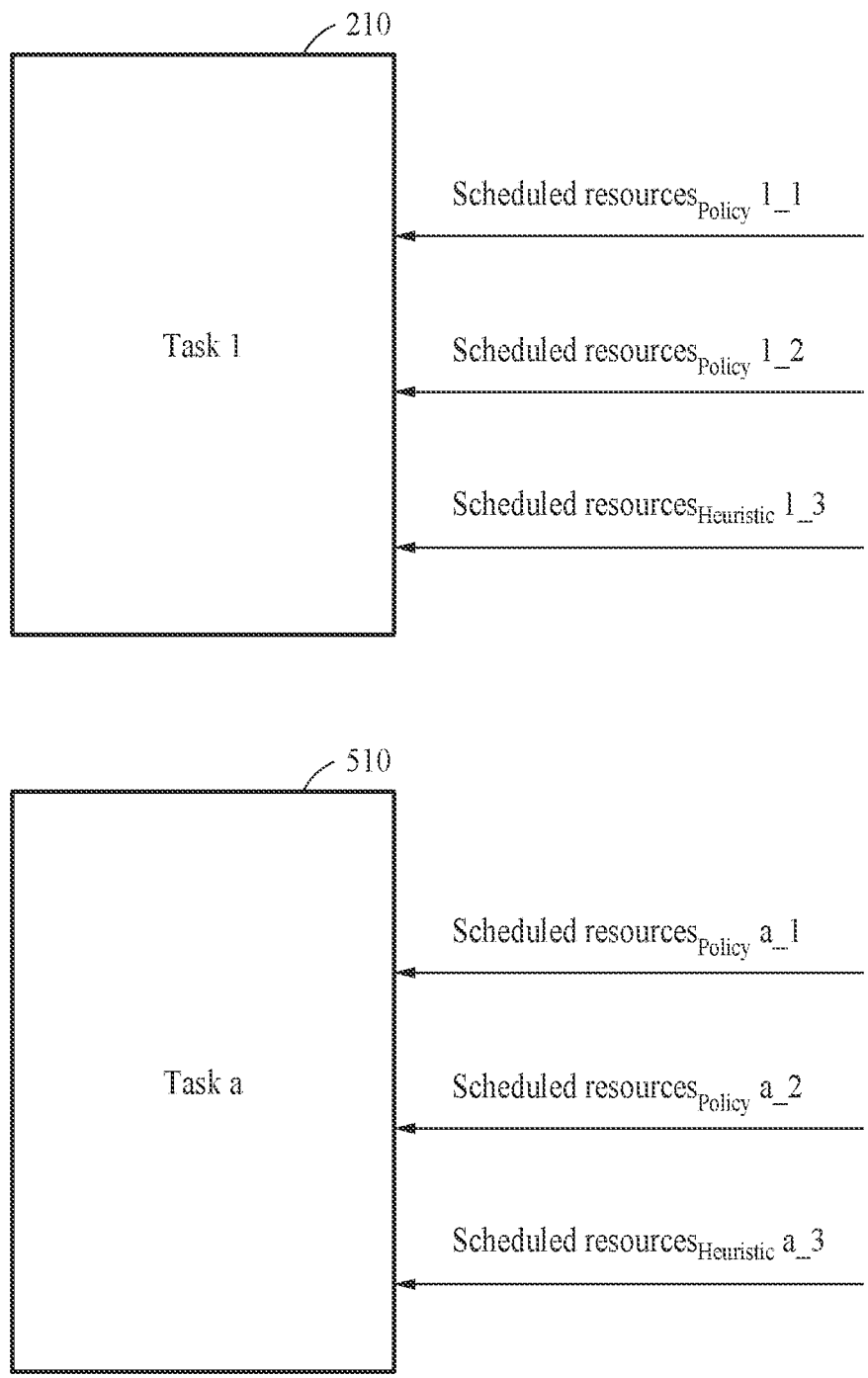
FIG. 5 illustrates an example of calculation of a current reward.

FIG. 5 illustrates an example of calculation of a current reward.

Referring to FIG. 5, resources$_{policy}$ 1_1, resources$_{policy}$ 1_2, and resources$_{Heuristic}$ 1_3 may be scheduled to the task 1 210.

The performance estimator 440 may calculate a current reward for each of the resources$_{policy}$ 1_1, the resources$_{policy}$ 1_2, and the resources$_{Heuristic}$ 1_3. For example, the performance estimator 440 may calculate a current reward for the resources$_{policy}$ 1_1 by predicting a total energy consumption of a system and a latency of the DL application 110 for the resources$_{policy}$ 1_1. The latency of the DL application 110 may correspond to a sum of latency values of the task 1 210, the task 2 220, and the task 3 230 of the DL application 110, and the total energy consumption of the system may correspond to a sum of energy consumption values of the system for each of the task 1 210, the task 2 220, and the task 3 230. An example of calculation of a latency of a predetermined task and an energy consumption of the system for the predetermined task will be described below.

In the example of FIG. 5, the performance estimator 440 may predict or calculate a latency of the DL application 110 for the resources$_{policy}$ 1_1 as $L_{1\_1}$, and may predict or calculate the total energy consumption of the system as $E_{1\_1}$. In this example, the performance estimator 440 may calculate $a \times L_{1\_1} + b \times E_{1\_1}$ as a current reward$_{1\_1}$ for the resources$_{policy}$ 1_1. Here, a and b may each be a weight.

Similarly, when a latency of the DL application 110 for the resources$_{policy}$ 1_2 is predicted or calculated as $L_{1\_2}$, and when an energy consumption of the system is predicted or calculated as $E_{1\_2}$, the performance estimator 440 may calculate $a \times L_{1\_2} + b \times E_{1\_2}$ as a current reward$_{1\_2}$ for the resources$_{policy}$ 1_2. When a latency of the DL application 110 for the resources$_{Heuristic}$ 1_3 is predicted or calculated as $L_{1\_3}$, and when an energy consumption of the system is predicted or calculated as $E_{1\_3}$, the performance estimator 440 may calculate $a \times L_{1\_3} + b \times E_{1\_3}$ as a current reward$_{1\_3}$ for the resources$_{Heuristic}$ 1_3.

The performance estimator 440 may provide the current reward$_{1\_1}$, the current reward$_{1\_2}$, and the current reward$_{1\_3}$ to the critic network 441, which will be further described below.

Also, as shown in FIG. 5, resources$_{policy}$ a_1, resources$_{policy}$ a_2, and resources$_{Heuristic}$ a_3 may be scheduled to a task a 510. Similarly to the current rewards of the resources$_{policy}$ 1_1, the resources$_{policy}$ 1_2, and the resources$_{Heuristic}$ 1_3, the performance estimator 440 may calculate a current reward of each of the resources$_{policy}$ a_1, the resources$_{policy}$ a_2, and the resources$_{Heuristic}$ a_3, and may provide the current reward of each of the resources$_{policy}$ a_1, the resources$_{policy}$ a_2, and the resources$_{Heuristic}$ a_3 to the critic network 441.

Hereinafter, calculation of a latency Latency($\tau$) of a task $\tau$ and an energy consumption E($\tau$) of a system for the task $\tau$ is described.

<Latency($\tau$)>

Latency($\tau$) may be expressed as shown in Equation 1 below.

$$\text{Latency}(\tau) = \max(L_c(\tau, 0), L_c(\tau, 1), \ldots L_c(\tau, m)) \quad \text{Equation 1}$$

In Equation 1, $L_c(\tau, m)$ denotes an execution latency of a data-parallel task $\tau$ assigned to a cluster m.

If the cluster m includes n cores, $L_c(\tau, m)$ may be expressed as shown in Equation 2 below.

$$L_c(\tau, m) = T(\tau, n) + C(l) \quad \text{Equation 2}$$

In Equation 2, $T(\tau, n)$ denotes an execution time of the task $\tau$ with n allocated cores, and C(l) denotes a communication time with a level l.

A workload of the task $\tau$ may be evenly distributed to the n cores, and accordingly $T(\tau, n)$ may be expressed as shown in Equation 3 below.

$$T(\tau, n) = \left\lceil \frac{W_\tau}{n} \right\rceil \quad \text{Equation 3}$$

In Equation 3, $W_\tau$ denotes the workload of the task $\tau$.

C(l) of Equation 2 may be expressed as shown in Equation 4 below.

$$C(l) = \frac{1}{m \cdot n} \sum (w_{ij} \cdot l + qd_l) \times A_{ij} \quad \text{Equation 4}$$

In Equation 4, A denotes an amount of an interaction between cores i and j, $w_{ij}$ denotes a weight of the interaction between cores i and j, and $qd_l$ denotes a queue delay. Since communications do not occur simultaneously, the queue delay may be used to calculate C(l).

In an example, n in Equation 4 may be replaced by Equation 5 shown below.

$$n_\tau = \sum_{m \in SC(\tau)} R^{PE}_{m,\tau} \quad \text{Equation 5}$$

In Equation 5, $R^{PE}_{m,i}$ denotes a number of cores allocated to the task $\tau$ in the cluster m. Since the number of cores is limited and core sharing is not allowed, a condition of Equation 6 shown below is established.

$$\Sigma R^{PE}_{m,\tau} \leq R^{PE}_{max} \quad \text{Equation 6}$$

In Equation 6, $R_{max}^{PE}$ denotes a maximum number of cores. The number of cores allocated to the task τ in the cluster m may be less than or equal to the maximum number of cores.

Also, a local memory size may be taken into consideration. A size of a memory allocated to the task τ in the cluster m may be expressed as shown in Equation 7 below.

$$R_{m,\tau}^{Mem} = \begin{cases} A_t^B + A_\tau^U \cdot NSC_{m,\tau}, & \text{if } NSC_{m,\tau} \geq 1 \\ 0, & \text{otherwise} \end{cases} \quad \text{Equation 7}$$

In Equation 7, $A_\tau^B$ denotes a size of binary of the task τ, $A_\tau^U$ denotes a size of unit data of the task τ, and $NSC_{m,\tau}$ denotes a number of $A_\tau^U$ received in a single communication for the task τ in the cluster m. The memory size limitation may be expressed as shown in Equation 8 below.

$$\Sigma R_{m,\tau}^{Mem} \leq R_{max}^{Mem} \quad \text{Equation 8}$$

In Equation 8, $R_{max}^{Mem}$ denotes a size of a memory.

Thus, the performance estimator 440 may calculate each of $L_c(\tau, 0)$ through $L_c(\tau, m)$ using Equations 2 through 8, and may determine a maximum latency among $L_c(\tau, 0)$ through $L_c(\tau, m)$ as Latency(τ) using Equation 1. Hereinafter, the energy consumption E(τ) is described.

<E(τ)>

E(τ) may be expressed as shown in Equation 9 below.

$$E(\tau) = \Sigma_{pe \in P} E_{pe} + \Sigma_{path \in R} E_{path} \quad \text{Equation 9}$$

In Equation 9, $E_{pe}$ denotes computing power consumed in a PE, and $E_{path}$ denotes power consumed in a data transmission in a network link.

$E_{pe}$ may be expressed as shown in Equation 10 below.

$$E_{pe} = stat_{pe} + dyn_{pe} \quad \text{Equation 10}$$

In Equation 10, $stat_{pe}$ denotes static power of a PE, and $dyn_{pe}$ denotes dynamic power of a PE. The static power may be power that is always consumed in the PE regardless of which PE is assigned, and the dynamic power may be power that is closely related to scheduling because the power is paid only when the task τ is executed.

$E_{path}$ may be expressed as shown in Equation 11 below.

$$E_{path} = stat_{path} + dyn_{path} \quad \text{Equation 11}$$

In Equation 11, $stat_{path}$ denotes static power in a communication, and $dyn_{path}$ denotes dynamic power in a communication. $stat_{path}$ may be expressed as shown in Equation 12 below, and $dyn_{path}$ may be expressed as shown in Equation 13 below.

$$stat_{path} = E_{switch} + E_{buffer} + E_{line} \quad \text{Equation 12}$$

$$dyn_{path} = tr_{ij} \times E_{transmit} \quad \text{Equation 13}$$

In Equation 12, $E_{switch}$, $E_{buffer}$, and $E_{line}$ denote a power consumption of a cross-switch, a power consumption of unit data in a buffer area of a routing node, and a power consumption of internal lines, respectively. In Equation 13, $E_{transmit}$ denotes a power consumption of unit data to be transmitted, and $tr_{ij}$ denotes traffic between nodes.

Figure 6A:
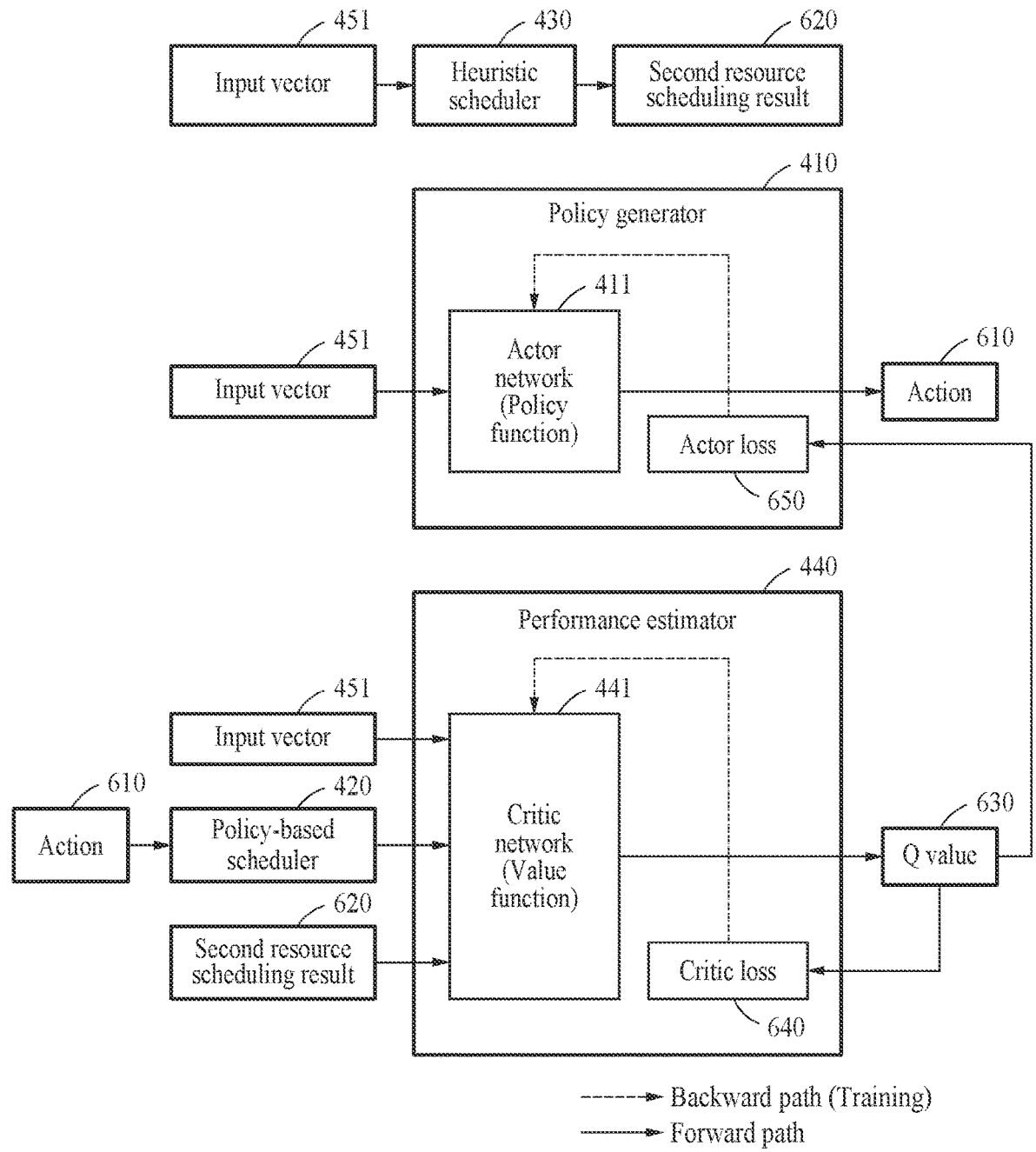
FIG. 6A illustrates an example of reinforcement learning (RL).

FIG. 6A illustrates an example of RL.

Referring to FIG. 6A, the actor network 411 may determine or select an action 610 for the input vector 451, based on the input vector 451. As described above, the action 610 may include a priority of each of hardware configurations for the task 1 210, and a priority of each of hardware configurations for the task a, The critic network 441 may be a network, for example, a DNN, configured to estimate a Q function. A Q function or a quality function may be expressed as shown in Equation 14 below. However, the disclosure is not limited to this example.

$$Q_\phi(s,a) \leftarrow r + \mathcal{Y} \max_a Q_\phi'(s,a) \quad \text{Equation 14}$$

In Equation 14, s denotes the input vector 451, a denotes the action 610, r denotes a current reward, $\mathcal{Y}$ denotes a discount factor, and $Q_\phi'(s,a)$ denotes a next input vector. In Equation 14, $\mathcal{Y} \max_a Q_\phi'(s,a)$ may correspond to a future reward.

The critic network 441 may receive, as inputs, the input vector 451, a first resource scheduling result of the policy-based scheduler 420, and a second resource scheduling result 620 of the heuristic scheduler 430.

The critic network 441 may calculate a Q value, a Q function value, or a quality value of each of the resources$_{policy}$ 1_1, the resources$_{policy}$ 1_2, and the resources$_{Heuristic}$ 1_3 scheduled to the task 1 210. The Q value may correspond to an expected cumulative reward or a cumulative sum of a current reward and a future reward. The performance estimator 440 or the critic network 441 may evaluate that resources with a maximum Q value among the resources$_{policy}$ 1_1, the resources$_{policy}$ 1_2, and the resources$_{Heuristic}$ 1_3 have the best performance. For example, when the resources$_{policy}$ 1_1 have the maximum Q value, the performance estimator 440 may select the resources$_{policy}$ 1_1 and may actually allocate the resources$_{policy}$ 1_1 to the task 1 210.

Similarly, the critic network 441 may calculate a Q value of each of the resources$_{policy}$ a_1, the resources$_{policy}$ a_2, and the resources Heuristic a_3 scheduled to the task a 510. For example, when the resources$_{policy}$ a_2 have a maximum Q value among the calculated Q values of the resources$_{policy}$ a_1, the resources$_{policy}$ a_2, and the resources policy$_{Heuristic}$ a_3, the performance estimator 440 or the critic network 441 may select the resources$_{policy}$ a_2 and may actually allocate the resources$_{policy}$ a_2 to the task a 510.

The performance estimator 440 may determine a critic loss 640 based on a Q value 630 of actually allocated resources, and may update the critic network 441 to minimize the critic loss 640.

The policy generator 410 may receive the Q value 630 of the actually allocated resources provided by the performance estimator 440, may determine an actor loss 650 based on the received Q value 630, and may update the actor network 411 to minimize the actor loss 650.

Figure 6B:
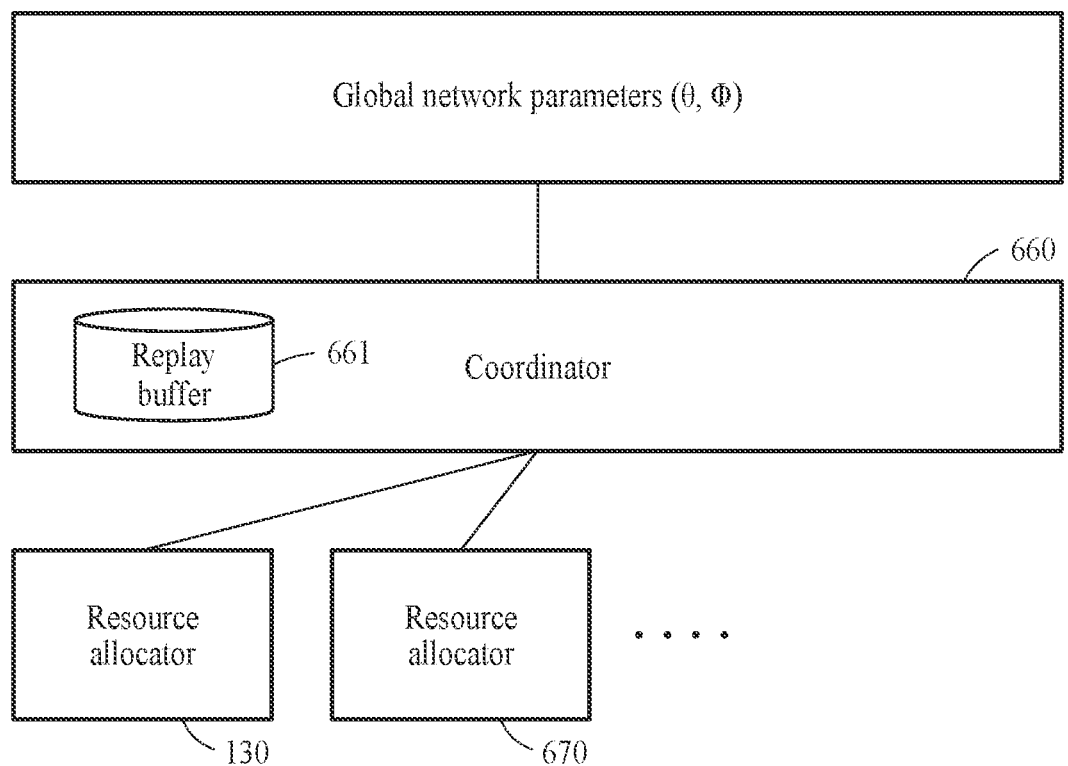
FIG. 6B illustrates an example of an RL-based framework.

FIG. 6B illustrates an example of an RL-based framework.

Referring to FIG. 6B, the RL-based framework may include, for example, a coordinator 660, and a plurality of resource allocators 130 and 670. The above description of the resource allocator 130 may also be applicable to the resource allocator 670, and, accordingly, further description of the resource allocator 670 is not repeated herein.

Although the resource allocators 130 and 670 are shown in FIG. 6B, this is merely an example. For example, the RL-based framework may include at least three resource allocators.

The resource allocators 130 and 670 may be individually trained. For example, when the coordinator 660 is absent, each of the resource allocators 130 and 670 may be trained to be biased toward a resource status. However, the coordinator 660 may prevent each of the resource allocators 130 and 670 from being trained to be biased toward the resource status.

The coordinator 660 may be, for example, a server of global network parameters θ and ϕ.

The coordinator 660 may receive samples from each of the resource allocators 130 and 670, and may store the received samples in a replay buffer 661. When a request for a sample is received from each of the resource allocators 130 and 670, the coordinator 660 may acquire arbitrary samples from the replay buffer 661, and may transmit each of the acquired samples to each of the resource allocators 130 and 670. Each of the resource allocators 130 and 670 may be trained based on the sample received from the coordinator 660. Thus, it is possible to train the resource allocators 130 and 670 to be unbiased toward the resource status.

The coordinator 660 may periodically collect network parameters of each of the resource allocators 130 and 670. For example, the coordinator 660 may receive a parameter θ_1 of the actor network 411 and a parameter ϕ_1 of the critic network 441 from the resource allocator 130, and may receive a parameter θ_2 of an actor network in the resource allocator 670 and a parameter ϕ_2 of a critic network in the resource allocator 670 from the resource allocator 670.

The coordinator 660 may evaluate performance of each of the resource allocators 130 and 670 based on network parameters of each of the resource allocators 130 and 670, and may transmit network parameters of a resource allocator with the best performance to another resource allocator. The other resource allocator may be updated based on the network parameters received from the coordinator 660. Accordingly, the coordinator 660 may allow the performance of the resource allocators 130 and 670 to be guaranteed at a predetermined level. In an example, the coordinator 660 may determine that the resource allocator 130 has the best performance between the resource allocators 130 and 670. In this example, the coordinator 660 may transmit the parameter θ_1 of the actor network 411 of the resource allocator 130 and the parameter ϕ_1 of the critic network 441 of the resource allocator 130 to the resource allocator 670. The resource allocator 670 may update the actor network of the resource allocator 670 based on the parameter θ_1, and may update the critic network of the resource allocator 670 based on the parameter ϕ_1.

Figure 7:
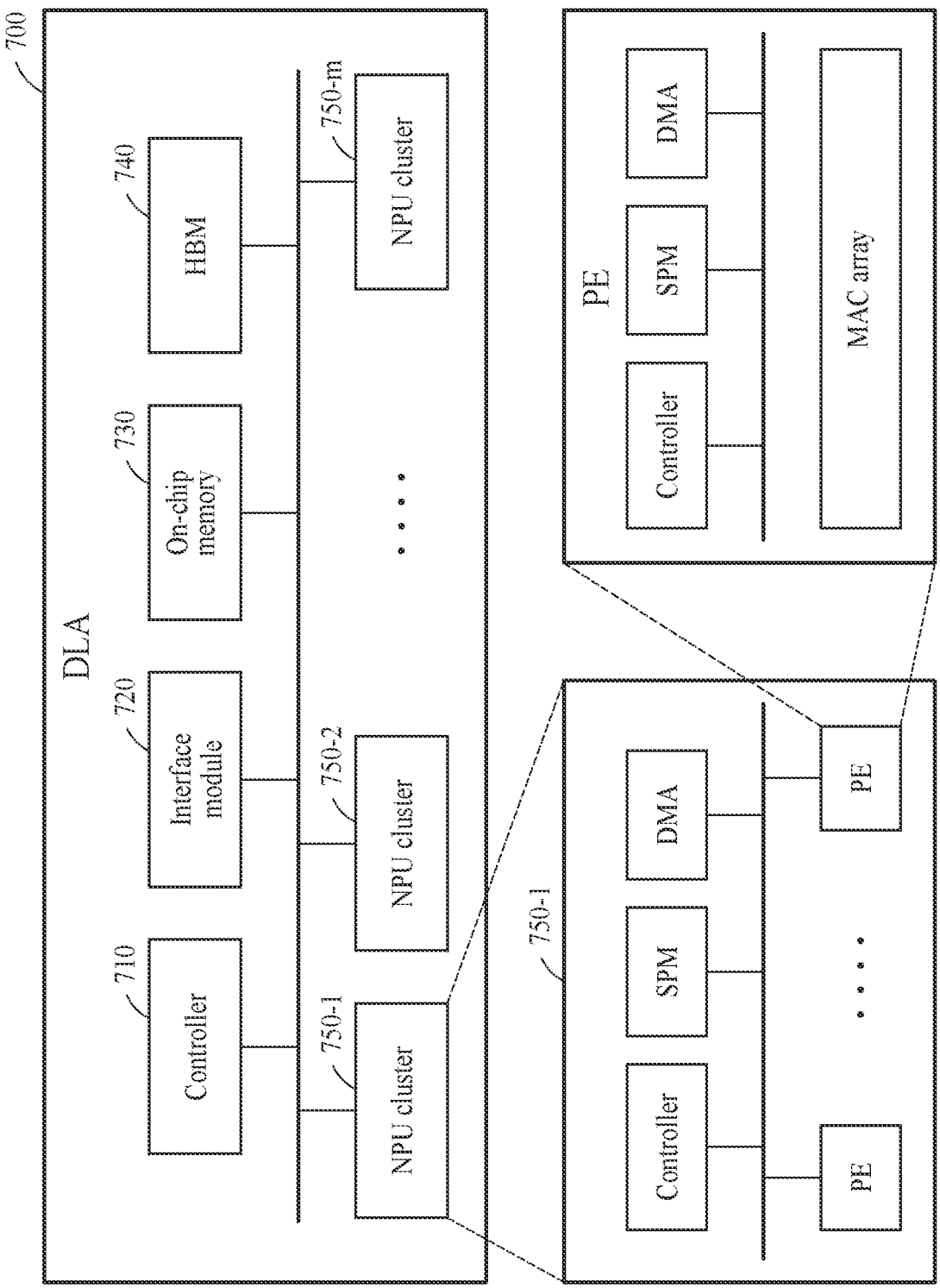
FIG. 7 illustrates an example of a deep learning accelerator (DLA).

FIG. 7 illustrates an example of a deep learning accelerator (DLA) 700.

Referring to FIG. 7, the DLA 700 may include, for example, a controller 710, an interface module 720, an on-chip memory 730, a high bandwidth memory (HBM) 740, and a plurality of NPU clusters 750-1 through 750-$m$.

The controller 710 may receive metadata of each of tasks from a host.

The controller 710 may implement the resource allocator 130. The resource allocator 130 may be applied to a DLA operating system (OS). The controller 710 may assign tasks to at least one of the NPU clusters 750-1 through 750-$m$. Also, in response to a request for a plurality of DL applications being sent to the host, the controller 710 may allocate resources to at least one of the NPU clusters 750-1 through 750-$m$, so that the DL applications may be processed in parallel.

The interface module 720 may function as an I/O interface.

The on-chip memory 730 and/or the HBM 740 may store input data and/or output data of each of the NPU clusters 750-1 through 750-$m$. Since the on-chip memory 730 and the HBM 740 are included in the DLA 700, the DLA 700 may more quickly perform artificial intelligence (AI) inference.

Each of the NPU clusters 750-1 through 750-$m$ may execute a task.

In the example of FIG. 7, the NPU cluster 750-1 may include a controller, an SPM, a direct memory access (DMA), and a plurality of PEs. The controller of the NPU cluster 750-1 may control the SPM and the plurality of PEs. Each of the PEs may execute a task when the task is assigned. The DMA may control input data and/or output data of the SPM based on a command of the controller.

Similarly to the NPU cluster 750-1, each of the other NPU clusters 750-2 through 750-$m$ may include a controller, an SPM, a DMA, and a plurality of PEs.

In the example of FIG. 7, each of the PEs may include a controller, an SPM, a DMA, and a multiply-and-accumulate (MAC) array. The controller of each of the PEs may control the SPM and the MAC array. The DMA of each of the PEs may control input data and/or output data of the SPM of each of the PEs based on a command of the controller of each of the PEs.

In another example, the DLA 700 may further include an accelerator for an RL operation. In this example, the DLA 700 may increase a processing speed of the RL operation, using the accelerator.

Figure 8:
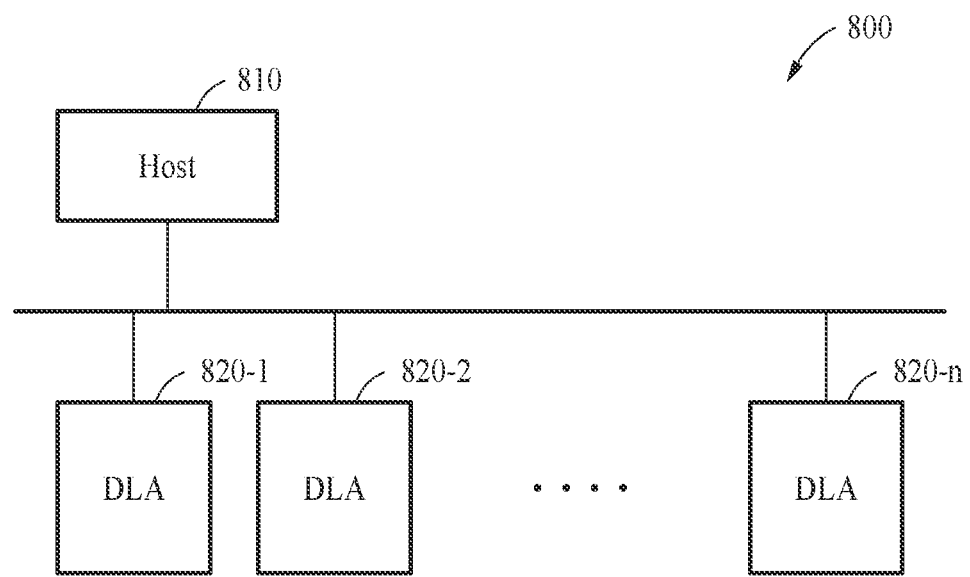
FIGS. 8 and 9 illustrate examples of a server.
Figure 9:
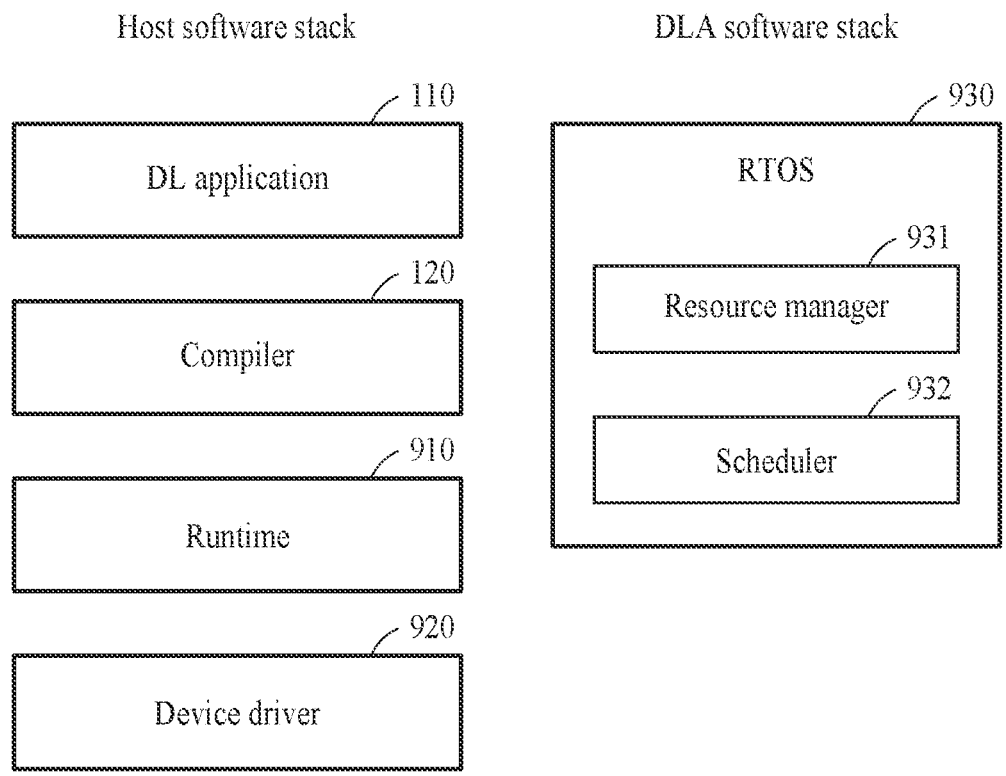

FIGS. 8 and 9 illustrate examples of a server 800.

The RL-based framework of FIG. 6B may be applied to the server 800 of FIGS. 8 and 9.

Referring to FIG. 8, the server 800 may include, for example, a host 810 and a plurality of DLAs 820-1 through 820-$n$.

Each of the plurality of DLAs 820-1 through 820-$n$ may correspond to, for example, the DLA 700 of FIG. 7.

The host 810 may include a host central processing unit (CPU) or a host processor. The host 810 may implement the above-described compiler 120.

FIG. 9 illustrates an example of a host software stack and a DLA software stack.

In the example of FIG. 9, the host software stack may include the DL application 110, the compiler 120, runtime software 910, and a device driver 920. The runtime software 910 may be expressed as runtime software.

The compiler 120 may perform a static analysis on the DL application 110, and may generate executable files for the DLA 700.

The runtime software 910 may manage requests of the DL application 110. When the plurality of DLAs 820-1 through 820-$n$ are included as shown in FIG. 8, the runtime software 910 may perform resource management and scheduling. In an example, when scheduling needs to be performed for the plurality of DLAs 820-1 through 820-$n$, the runtime software 910 may perform an operation of the above-described resource allocator 130.

The device driver 920 may control hardware included in the host 810.

The DLA software stack may include a real-time operation system (RTOS) 930, and the RTOS 930 may include a resource manager 931 and a scheduler 932. The resource manager 931 and the scheduler 932 may implement the above-described resource allocator 130.

The above description provided with reference to FIGS. 1 through 7 may also be applicable to the examples of FIGS. 8 and 9, and, accordingly, further description is not repeated herein.

Figure 10:
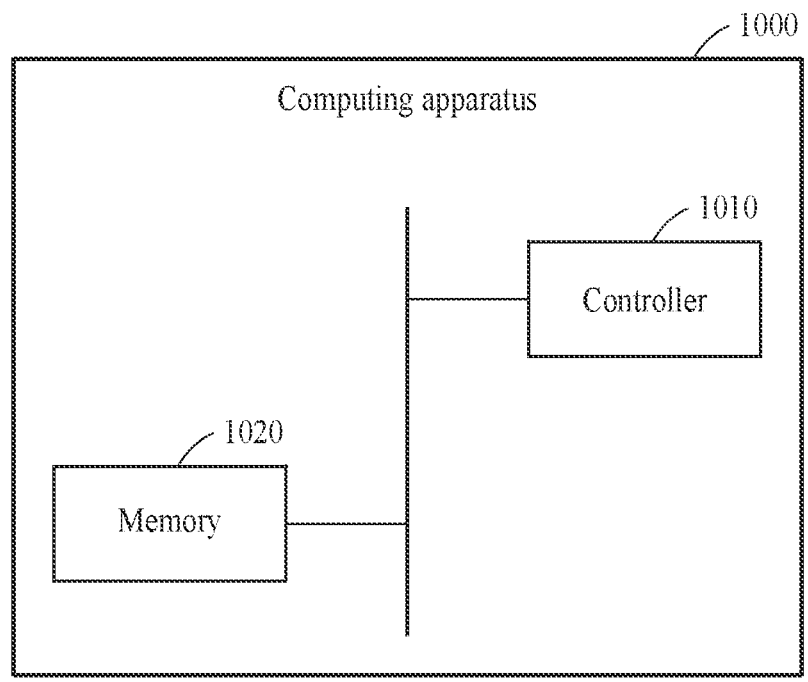
FIG. 10 illustrates an example of a computing apparatus.

FIG. 10 illustrates an example of a computing apparatus 1000.

Referring to FIG. 10, the computing apparatus 1000 may include, for example, a controller 1010 and a memory 1020.

The computing apparatus 1000 may correspond to the DLA 700 of FIG. 7. Also, the computing apparatus 1000 may correspond to the DLAs 820-1 through 820-$n$ of FIG. 8. However, the computing apparatus 1000 is not limited to the aforementioned examples, and may correspond to, for example, a mobile terminal such as a mobile phone or a tablet terminal.

The memory 1020 may store DLA software described with reference to FIG. 9.

The controller 1010 may implement the above-described resource allocator 130 by executing the DLA software.

The controller 1010 may generate the input vector 451 that includes a resource status and metadata of each of tasks for parallel execution.

The controller 1010 may determine an action for the input vector 451 by executing the actor network 411 based on the input vector 451.

The controller 1010 may perform first resource scheduling for each of the tasks based on the determined action, and may perform second resource scheduling for each of the tasks based on the input vector 451.

The controller 1010 may evaluate performance of first resource scheduling results and second resource scheduling results for each of the tasks, using the critic network 441, may select one of the first and second resource scheduling results for each of the tasks based on an evaluation result of the critic network 441, and may allocate resources to each of the tasks based on a resource scheduling result selected for each of the tasks.

The above description provided with reference to FIGS. 1 through 9 may also be applicable to the examples of FIG. 10, and, accordingly, further description is not repeated herein.

Figure 11:
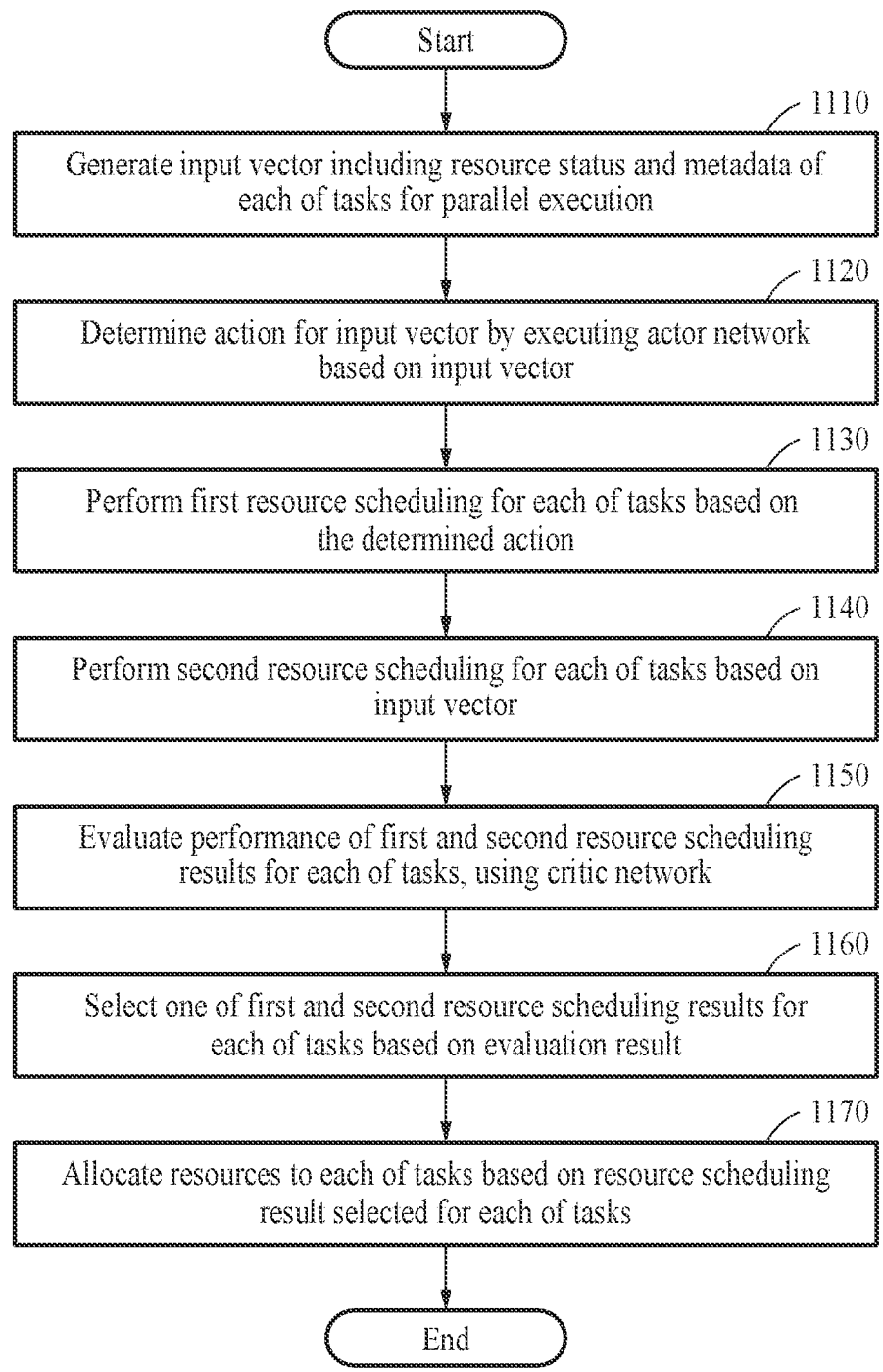
FIG. 11 illustrates an example of a scheduling method of a computing apparatus.

FIG. 11 illustrates an example of a scheduling method of a computing apparatus.

Referring to FIG. 11, in operation 1110, the computing apparatus 1000 generates the input vector 451 that includes a resource status and metadata of each of tasks for parallel execution.

In operation 1120, the computing apparatus 1000 determines an action for the input vector 451 by executing the actor network 411 based on the input vector 451.

In operation 1130, the computing apparatus 1000 performs first resource scheduling for each of the tasks based on the determined action.

In operation 1140, the computing apparatus 1000 performs second resource scheduling for each of the tasks based on the input vector 451.

In operation 1150, the computing apparatus 1000 evaluates performance of first resource scheduling results and second resource scheduling results for each of the tasks, using the critic network 441.

In an example, when resources based on the first resource scheduling are assumed to be utilized for a predetermined task among the tasks, the computing apparatus 1000 may calculate a current reward of a first resource scheduling result of the predetermined task based on a total energy consumption and an application latency associated with the predetermined task in operation 1150. In another example, when resources based on the second resource scheduling are assumed to be utilized for the predetermined task, the computing apparatus 1000 may calculate a current reward of a second resource scheduling result of the predetermined task based on the total energy consumption and the application latency associated with the predetermined task. Calculation of the current reward has been described above with reference to FIG. 5, and, accordingly, further description thereof is not repeated herein.

The computing apparatus 1000 may calculate a quality value of the first resource scheduling result of the predetermined task based on the current reward of the first resource scheduling result of the predetermined task, using the critic network 441. Also, the computing apparatus 1000 may calculate a quality value of the second resource scheduling result of the predetermined task based on the current reward of the second resource scheduling result of the predetermined task, using the critic network 441. A resource scheduling result with a relatively high quality value may be evaluated to be relatively high.

In operation 1160, the computing apparatus 1000 selects one of the first and second resource scheduling results for each of the tasks based on an evaluation result. For example, the computing apparatus 1000 may select a resource scheduling result with a maximum quality value among quality values of the first resource scheduling results and quality values of the second resource scheduling results.

In operation 1170, the computing apparatus 1000 allocates resources to each of the tasks based on a resource scheduling result selected for each of the tasks.

The above description provided with reference to FIGS. 1 through 10 may also be applicable to the example of FIG. 11, and accordingly further description is not repeated herein.

The compiler 120, the resource allocators 130 and 670, the resources 140, the resource monitor 150, the policy generator 410, the actor network 411, the policy-based scheduler 420, the heuristic scheduler 430, the performance estimator 440, the critic network 441, the vector generator 450, the examiner 460, the replay buffers, 470 and 661, the coordinator 660, the DLAs 700 and 820-1 to 820-$n$, the controller 710, the interface module 720, the on-chip memory 730, the HBM 740, the NPU clusters 750-1 to 750-$m$, the server 800, the host 810, the controller 1010, the memory 1020, the controllers, the SPMs, the DMAs, the PEs, the MAC arrays, the processors, and the memories in FIGS. 1 to 11 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1 to 11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A scheduling method performed by a computing apparatus, the scheduling method comprising:
   generating an input vector comprising a resource status and metadata of each of tasks for parallel execution;
   determining an action for the input vector by executing an actor network based on the input vector;
   performing first resource scheduling for each of the tasks based on the determined action;
   performing second resource scheduling for each of the tasks by applying the input vector to a heuristic algorithm;
   evaluating performance of first resource scheduling results of the first resource scheduling and second resource scheduling results of the second resource scheduling, for each of the tasks, using a critic network;
   selecting one of the first and second resource scheduling results for each of the tasks based on a result of the evaluating; and
   allocating resources to each of the tasks based on a resource scheduling result selected for each of the tasks.

2. The scheduling method of claim 1, wherein the determined action comprises a priority of each of hardware configurations of each of the tasks.

3. The scheduling method of claim 2, wherein the performing of the first resource scheduling comprises performing the first resource scheduling for each of the tasks based on the priority of each of the hardware configurations of each of the tasks.

4. The scheduling method of claim 2, wherein the hardware configurations of each of the tasks are different hardware allocations that allow each of the tasks to run.

5. The scheduling method of claim 2, wherein the metadata comprises the hardware configurations of each of the tasks including first and second hardware configurations of a first task, the first and second hardware configurations having respectively different priorities in the determined action.

6. The scheduling method of claim 1, further comprising:
determining that the tasks are independent of each other and selecting the tasks, in response to an occurrence of a rescheduling point in an execution code being recognized.

7. The scheduling method of claim 6, wherein the rescheduling point corresponds to a start of a deep learning (DL) application, a completion of a task among the tasks, or an end of the DL application.

8. The scheduling method of claim 1, wherein the evaluating of the performance comprises:
calculating a current reward of the first resource scheduling result of one task among the tasks and a quality value of the first resource scheduling result of the one task using the critic network; and
calculating a current reward of the second resource scheduling result of the one task and a quality value of the second first resource scheduling result of the one task using the critic network.

9. The scheduling method of claim 8, wherein the evaluating of the performance comprises:
calculating the current reward of the first resource scheduling result of the one task based on a total energy consumption and an application latency associated with the one task, in response to an assumption that resources based on the first resource scheduling are utilized for the one task; and
calculating the current reward of the second resource scheduling result of the one task based on the total energy consumption and the application latency associated with the one task, in response to an assumption that resources based on the second resource scheduling are utilized for the one task.

10. The scheduling method of claim 1, wherein the metadata comprises any one or any combination of any two or more of an identifier of each of the tasks, a prerequisite task of each of the tasks, information about an input of each of the tasks, information about an output of each of the tasks, a batch identifier, and a-configuration profiles of each of the tasks.

11. The scheduling method of claim 10, wherein the configuration profiles of each of the tasks comprise hardware configurations of each of the tasks, and an expected performance value of each of the hardware configurations.

12. A non-transitory, computer-readable storage medium storing instructions that, when executed by a processor, cause the processor to perform the method of claim 1.

13. The scheduling method of claim 1, wherein the method further comprises updating the critic network to reduce a critic loss that is dependent on which of the first and second resource scheduling results is the selected one of the first and second resource scheduling results.

14. A computing apparatus, comprising:
a controller configured to:
generate an input vector comprising a resource status and metadata of each of tasks for parallel execution;
determine an action for the input vector by executing an actor network based on the input vector;
perform first resource scheduling for each of the tasks based on the determined action;
perform second resource scheduling for each of the tasks by applying the input vector to a heuristic algorithm;
evaluate performance of a first resource scheduling result of the first resource scheduling and a second resource scheduling result of the second resource scheduling, for each of the tasks, using a critic network;
select one of the first and second resource scheduling results based on a result of the evaluating; and
allocate resources to each of the tasks based on the selected resource scheduling result.

15. The computing apparatus of claim 14, wherein the determined action comprises a priority of each of hardware configurations of each of the tasks.

16. The computing apparatus of claim 15, wherein the controller is further configured to perform the first resource scheduling for each of the tasks based on the priority of each of the hardware configurations of each of the tasks.

17. The computing apparatus of claim 15, wherein the hardware configurations of each of the tasks are different hardware allocations that allow each of the tasks to run.

18. The computing apparatus of claim 14, wherein the controller is further configured to determine that the tasks are independent of each other and select the tasks, in response to an occurrence of a rescheduling point in an execution code being recognized.

19. The computing apparatus of claim 18, wherein the rescheduling point corresponds to a start of a deep learning (DL) application, a completion of a task among the tasks, or an end of the DL application.

20. The computing apparatus of claim 14, wherein the controller is further configured to:
calculate a current reward of the first resource scheduling result of one task among the tasks and a quality value of the first resource scheduling result of the one task using the critic network; and
calculate a current reward of the second resource scheduling result of the one task and a quality value of the second first resource scheduling result of the one task using the critic network.

21. The computing apparatus of claim 20, wherein the controller is further configured to:
calculate the current reward of the first resource scheduling result of the one task based on a total energy consumption and an application latency associated with the one task, in response to an assumption that resources based on the first resource scheduling are utilized for the one task; and
calculate the current reward of the second resource scheduling result of the one task based on the total energy consumption and the application latency associated with the one task, in response to an assumption that resources based on the second resource scheduling are utilized for the one task.

* * * * *